United States Patent

[11] 3,633,806

[72] Inventor Sheldon Lee Pastor
St. Paul, Minn.
[21] Appl. No. 2,121
[22] Filed Jan. 12, 1970
[45] Patented Jan. 11, 1972
[73] Assignee Minnesota Mining and Manufacturing Company
St. Paul, Minn.

[54] MAGNETIC TAPE CARTRIDGE
5 Claims, 5 Drawing Figs.

[52] U.S. Cl. .......... 226/90, 274/4 F
[51] Int. Cl. .......... G11b 15/66
[50] Field of Search .......... 226/90, 118, 180; 274/4 B, 4 E, 4 C, 4 F, 4 G; 242/197, 198, 199, 200, 55.19 A

[56] References Cited
UNITED STATES PATENTS
3,001,025 9/1961 Gaubert .......... 242/55.19 A

*Primary Examiner*—Allen N. Knowles
*Attorney*—Kinney, Alexander, Sell, Steldt & Delahunt

ABSTRACT: A tape recording and/or reproducing machine utilizing a cartridge which is formed to mate complementarily with the machine and pivot thereon for moving a pressure roller supported in the cartridge against a capstan having an axis parallel to and spaced from the cartridge pivot axis to press a length of tape in the cartridge against the capstan.

INVENTOR.
SHELDON LEE PASTOR
BY Kinney, Alexander,
Sell, Steldt & DeLaHunt
ATTORNEYS INVENTOR.
SHELDON LEE PASTOR
BY Kinney, Alexander,
Sell, Steldt & DeLaHunt
ATTORNEYS

MAGNETIC TAPE CARTRIDGE

This invention relates to a recording machine utilizing a web of material as the record medium and in one aspect to a cartridge and machine combination for supplying an endless length of magnetic tape to a recording and/or reproducing machine.

The prior art is replete with tape cartridges for use with recording and/or reproducing machines having a drive capstan in which the pressure roller for pressing the magnetic tape against the capstan is carried in the cartridge. Such cartridges are, for example, disclosed in U.S. Pat. Nos. 2,679,394; 2,778,880; and 2,821,576. With this type of cartridge it is extremely important to provide means for aligning the cartridge in the recording and/or reproducing machine to position the pressure roller with its axis parallel to the axis of the capstan. If this is not accomplished, excessive amounts of wow and flutter will result due to nonuniform driving of the tape past the magnetic head by the capstan and pressure roller drive. In most devices this has been accomplished by providing the cartridge with a pair of spaced parallel walls between which the pressure roller is supported on an axis perpendicular to these walls and the cartridge is slid along a flat wall in the machine from which the capstan extends perpendicularly to press the tape between the capstan and the pressure roller. However, this has been found disadvantageous because it is difficult to maintain the manufacturing tolerances on the large number of dimensions which must be controlled to prevent misalignment.

The present invention provides novel and simple means for providing parallelism between a pressure roller journaled in the cartridge and the capstan in the recording and/or reproducing machine while at the same time advantageously permitting interruption of the movement of the tape by separating the pressure roller from the capstan.

In the combination according to the present invention, the novel cartridge with a prescribed pivot axis and a pressure roller spaced therefrom serves as the lever arm to afford drive engagement with the tape when required. Previously this has been satisfactorily achieved only in reel-to-reel recorders as opposed to cartridge recorders. The combination also provides for movement of the tape toward and away from engagement with the head by similarly pivoting the tape path as the cartridge is pivoted.

The tape cartridge of the present invention is provided for supplying a length of tape to a recording and/or reproducing machine having a drive capstan and cartridge supporting and mating means for defining a pivot axis for a mating cartridge parallel to the axis of the capstan. The cartridge comprises a container formed of shell means defining a boxlike enclosure having an access opening for the capstan and complementary mating means for mating with the cartridge mating means in the recording and/or reproducing machine to define a pivot axis for the cartridge. A pressure roller is supported in the enclosure in spaced relation to said pivot axis and parallel thereto. Means defining a tape guide path is provided in the enclosure to position a length of tape adjacent the pressure roller and the access opening, and a length of magnetic tape extends along the tape guide path and past the pressure roller to be pressed against the drive capstan when inserted in the access opening and upon rotation of the container on the cartridge mating means.

Further novel features and advantages of the present invention will become apparent after reading the following description which refers to the accompanying drawings, wherein.

Figure 1:
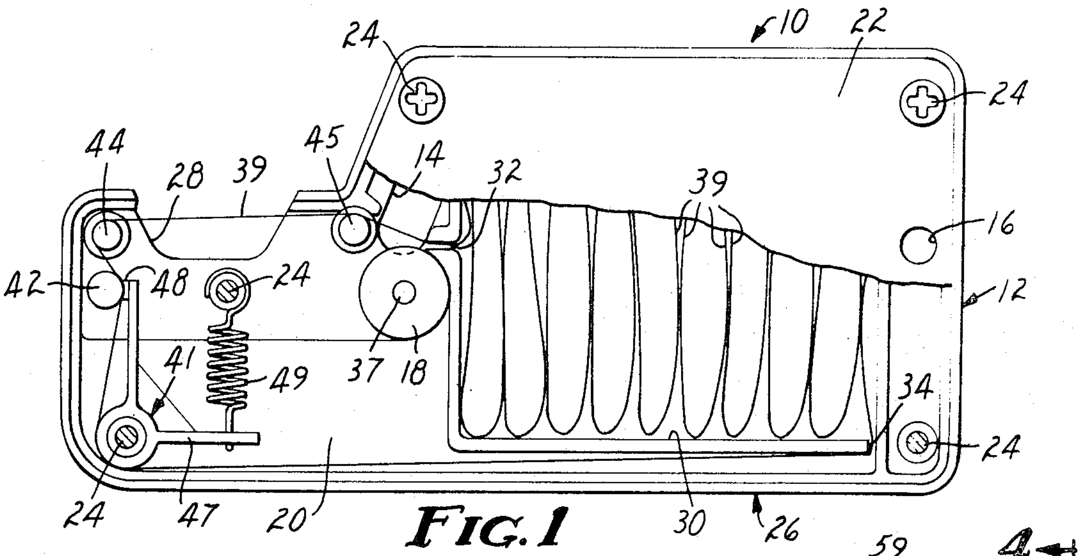
FIG. 1 is a plan view of a magnetic tape cartridge made in accordance with the present invention and partially in section.

Referring now to FIG. 1 there is illustrated a magnetic tape cartridge made in accordance with the present invention and generally designated 10. The cartridge 10 comprises a shell defining a boxlike container 12 having a slotted access opening 14 in one sidewall for access by a capstan 52 and a complementary cartridge mating aperture 16. A pressure roller 18 is supported within the container 12 and tape guides define a tape path through the container 12 past the pressure roller 18.

The cartridge shell comprises a pair of flat generally rectangular metal plates 20 and 22 having an identical shape which are maintained in spaced parallel relationship by five precisely made spacing studs 24 to define the sidewalls. A molded plastic body 26 sandwiched between the parallel plates 20 and 22 defines the edge walls of the cartridge and has transverse and spaced wall members to divide the space between the parallel plates 20 and 22. The body 26 is discontinuous to define a second access opening or cutaway portion 28 in one edge wall. The upper and lower plates 20 and 22 and the body 26 define a rectangular tape storage compartment 30 at the end of the cartridge 10 remote from the cutaway portion 28 with a tape inlet slot 32 in the transverse walls of the body through which tape may be pushed into the storage compartment 30 and a tape outlet slot 34 through which tape may be withdrawn from the storage compartment 30.

Means are provided within the cartridge to define a guide path for a continuous loop of magnetic tape 39 from the slot 34 to the slot 32. The tape 39 is looped back and forth upon itself in the tape storage compartment 30 and it extends along the tape guide path from the tape outlet slot 34 along one edge of the cartridge between an edge wall and a spaced interior wall of the body 26 and around a cylindrical support comprising part of a tape tensioner 41. The tape then passes over a tape tensioning stud 42, around a first tape guide 44 and across the cutaway portion 28 of the cartridge 10 to a second tape guide 45. From the second tape guide 45 the guide path extends past the periphery of the pressure roller 18 on the side adjacent the slotted access opening 14 and then back into the storage compartment 30 through the tape inlet slot 32 which is closely adjacent the periphery of the pressure roller.

The tape tensioner 41 comprises an L-shaped member 47 formed with a hollow cylinder which is fit over a spacing stud 24 to permit rotation of the tape tensioner 41 about the spacing stud 24. One leg of the L-shaped member 47 extends adjacent the tape tensioning stud 42 and a piece of felt 48 is secured to the tape tensioning member 47 between it and the tape tensioning stud 42 to engage the tape. A tension spring 49 is attached to the other leg of the tape tensioning member 47 to bias the tensioning member about the spacing stud 24 to press the tape 39 between the tape tensioning stud 42 and the felt 48.

The complementary cartridge mating aperture 16 is defined by a circular aperture in each of the cartridge plates 20 and 22 and a guide aperture through the plastic body 26 to guide a shaft between the apertures in the plates 20 and 22. The circular apertures in the metal plates are precisely located with respect to openings for attachment of the spacing studs 24 in each of the plates 20 and 22 so that when assembled the axis of the complementary cartridge mating aperture 16 is parallel to the axis of the spacing studs 24 and perpendicular to the upper and lower plates 20 and 22. The pressure roller 18 is freely rotatably supported on a pin or shaft 37 with its periphery adjacent the tape inlet slot 32 to the storage compartment 30. The shaft 37 is supported between the cartridge plates 20 and 22. The ends of the pressure roller shaft 37 are attached to the upper and lower plates 20 and 22 at points precisely located with respect to the spacing studs 24 to provide definite location and parallelism between the axes of the pressure roller shaft 37, the spacing studs 24, and the complementary cartridge mating aperture 16.

Figure 2:
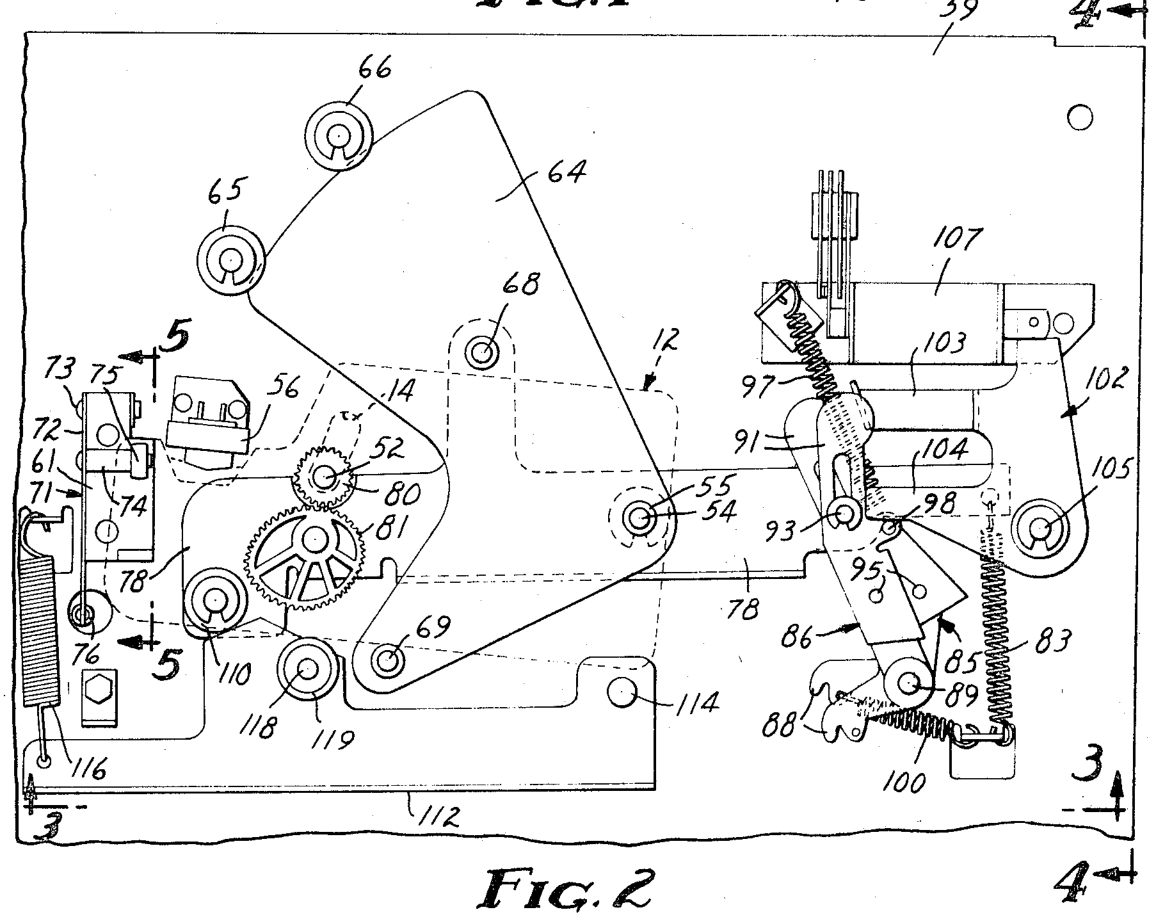
FIG. 2 is a plan view of the recording and/or reproducing machine constructed in accordance with the present invention with the cartridge of FIG. 1 shown in broken lines in operative position.
Figure 3:
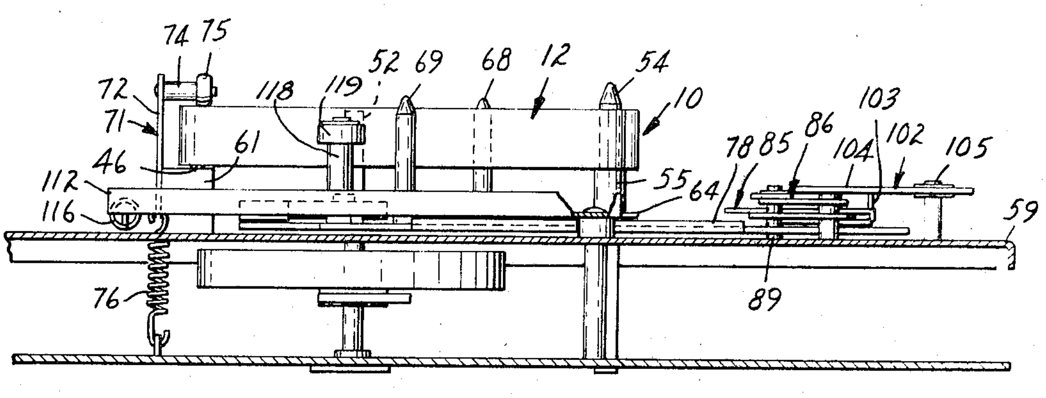
FIG. 3 is a cross-sectional view of the machine and cartridge taken along line 3—3 of FIG. 2.
Figure 4:
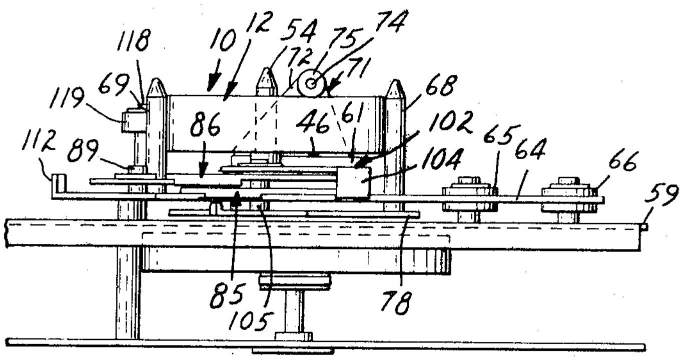
FIG. 4 is a cross-sectional view taken along line 4—4 of FIG. 2.

The recording and/or reproducing machine for use with the cartridge 10 is illustrated in FIG. 2 and includes a capstan 52, a cartridge mating and support shaft 54, a magnetic head 56 and a mechanical assemblage for rotating the cartridge 10 about the cartridge mating and support shaft 54.

The cartridge mating and support shaft 54 is stationary and has a diameter substantially equal to that of the complementary cartridge mating aperture 16 in the cartridge 10 to be received slidably therein complementary therewith. It is cone-shaped at its upper end to aid in aligning the complementary cartridge mating aperture 16 with it. It is also formed with a shoulder 55 to support the lower cartridge plate 20 around the cartridge mating aperture 16 above an upper support deck 59 with the mating portion of the shaft 54 extending through the cartridge 10. A cartridge support platform 61 is raised above the upper support deck 59 with its upper surface planar and parallel to the upper surface of the shoulder 55 on the cartridge mating and support shaft 54. The support platform 61 does not rise above the upper support deck 59 as far as the shoulder 55 on the cartridge mating shaft 54. The first tape guide 44 in the cartridge 10 is formed with a head 46 projecting from the lower cartridge plate 20 a distance equal to the height differential between the platform 61 and the shoulder 55 on the cartridge mating shaft 54. This provides precise location of the magnetic tape 39 with respect to the magnetic head 56 by locating the tape guide 44 at one end of the cartridge and the cartridge mating aperture 16 at the other end of the cartridge.

Figure 5:
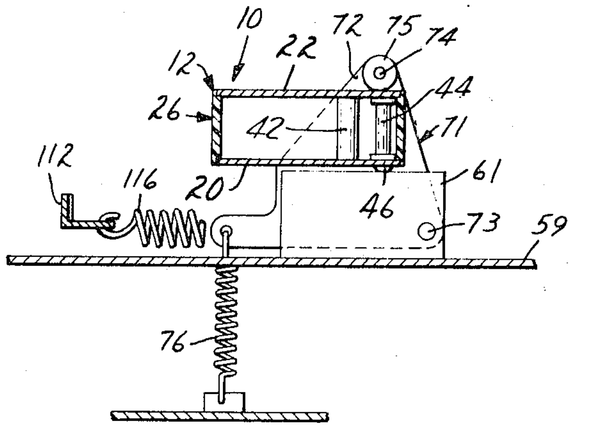
FIG. 5 is a cross-sectional view taken along line 5—5 of FIG. 2.

A cartridge holddown 71 is provided to further aid in precisely locating the cartridge 10 when the tape is driven past the magnetic head 56. It comprises a generally triangular plate 72 which is rotatably supported on a horizontal shaft 73 at the back of the cartridge support platform 61. A shaft 74 extends horizontally from the triangular plate 72 above the cartridge support area and it carries a resilient wheel 75 at its end. The resilient wheel 75 is supported to contact the cartridge 10 above the first tape guide 44 when the cartridge is rotated into operative association with the capstan 52 and the magnetic head 56 as most clearly illustrated in FIG. 5. The end of the triangular plate 72 remote from the support shaft 73 is biased downward (see FIG. 5) by a tension spring 76 extending through an aperture in the upper deck 59. When the cartridge 10 is in the operative position the spring biased resilient wheel 75 holds the edge of the cartridge down to assure that the head 46 of the tape guide 44 properly contacts the cartridge support platform 61. The movement of the triangular plate 72 by the spring 76 is limited by the plate 72 contacting the upper support deck 59. This permits the edge of the cartridge 10 to be moved under the resilient wheel 75 and lift the wheel 75 against the bias of the spring 76.

The capstan 52 is supported with its axis parallel to that of the cartridge mating and support shaft 54. It comprises a stub shaft which extends through the capstan access opening 14 in the cartridge 10 adjacent the tape path and the pressure roller 18 without contacting the upper cartridge plate 22. The access opening 14 in the cartridge 10 is oblong and extends generally along a radius from the cartridge mating aperture 16 to permit oscillating movement of the cartridge 10 with respect to the capstan 52. The magnetic head 56 is positioned to engage the tape 39 in the cutaway portion 28 of the cartridge 10 when the cartridge 10 is rotated about the cartridge mating shaft 54 to press the tape between the pressure roller 18 and the capstan 52.

The cartridge rotating mechanism includes an L-shaped cartridge locating link 64 that is rotatably supported on the cartridge support shaft 54 below the cartridge support area. One leg of this link 64 is a fan-shaped and supported in a slot in each of a pair of guide rollers 65 and 66. Midway of this leg, the cartridge locating link 64 carries a vertical cartridge locating shaft 68 which with a similar shaft 69 in the other leg of the locating link 64 defines boundaries for receiving the cartridge 10 in the machine.

The rear cartridge locating shaft 68 extends through the cartridge locating link 64 and is attached to an eccentric gear support link 78. The support link 78 extends along the upper support deck 59 below the locating link 64 and it is supported for rotation about the cartridge mating and support shaft 54. Below the cartridge support area, the capstan 52 carries a spur gear 80 and an eccentric gear 81 is rotatably supported on the support link 78 adjacent the capstan spur gear 80 and has teeth complementary therewith. At the end of the support link 78 remote from the eccentric gear 81, a tension spring 83 connects the support link 78 to the upper support deck 59 to bias the support link 78 about the cartridge mating and support shaft 54 to engage the eccentric gear 81 with the capstan gear 80.

A pair of similar knuckles 85 and 96 normally maintain the support link 78 in a position to maintain the eccentric gear 81 disengaged from the capstan spur gear 80. Each knuckle 85 or 86 comprises an L-shaped member 88 rotatably supported at the juncture of its legs on a stationary shaft 89 and a body 91 formed with a slot through which a shaft 93 extending from the eccentric gear support link 78 passes to connect the knuckles 85 and 86 to the support link 78. At one end spaced from its connection to the support link 78 each knuckle body 91 is connected by a pin 95 to permit relative rotation between its L-shaped member 88 and its body 91. At its opposed end each knuckle body 91 is formed with a rounded lobe. The body 91 of each of the knuckles 85 and 86 has a vertically extending portion adjacent the associated L-shaped member 88 to the side thereof furthest removed from the cartridge receiving area. This prevents the L-shaped member 88 of the knuckles 85 and 86 from rotating any further counterclockwise about the stationary support shaft 89 than shown for the upper knuckle 86 in FIG. 2. A tension spring 97 extends between a pin 98 on the body of the upper knuckle 86 and the upper support deck 59 to bias the body 91 of the upper knuckle 86 counterclockwise (as viewed in FIG. 2) about the support shaft 93 on the support link 78 to break the upper knuckle 86. A tension spring 100 extends between the L-shaped member 88 of the lower knuckle 85 and the upper support deck 59 to bias the L-shaped member 88 of the lower knuckle 85 counterclockwise about its stationary support shaft 89 to make the lower knuckle 85.

A solenoid link 102 is supported for rotation about a shaft 105 extending from the upper support deck 59 to control the movement of the knuckles 85 and 86. The solenoid link 102 is formed with a U-shaped body between the support shaft and its connection with a solenoid 107 defined by parallel legs 103 and 104 disposed in different planes. The forward most leg 104 of the solenoid link 102 is vertically aligned with the pin 98 of the upper knuckle 86 to which the spring 97 is attached while the rear leg is formed with an upturned end to engage the lobe of the lower knuckle 85. The solenoid link 102 upon counterclockwise rotation about its support shaft 105, through its rear leg 103, presses against the lobe of the lower knuckle 85 to break the lower knuckle against the force of its associated tension spring 100 and, through its front leg 104 against the pin 98 on the upper knuckle 86, it makes or locks the upper knuckle 86 against the force of the tension spring 97. Upon clockwise rotation of the solenoid link 102, it is moved out of contact with the knuckles 85 and 86 and the springs 97 and 100 are permitted to act to make or lock the lower knuckle 85 and to break the upper knuckle 86. Therefore, cooperation of the solenoid link 102 and the knuckles 85 and 86 provide two positions for the eccentric gear support link 78. Through the rear cartridge locating shaft 68, these two positions of the support link 78 provide two positions for the locating link 64 and through the cartridge locating shafts 68 and 69 two positions for the cartridge 10. In the first position, the cartridge locating shafts 68 and 69 provide a receiving area for the cartridge in which the cartridge may be placed with its complementary mating aperture 16 over the cartridge mating and support shaft 54 with the head 46 of the first tape guide 44 resting on the cartridge support platform 61 and spaced from the cartridge holddown 71, and the tape disengaged from the magnetic head 56 and the capstan 52. The second position is provided as illustrated in FIG. 2 with the cartridge locating shafts 68 and 69 rotating the cartridge into an operative association with the magnetic head 56 and the capstan 52.

Adjacent the eccentric gear 81 a cylindrical bushing 110 is supported on the support link 78 below the cartridge receiving area. This cylindrical bushing 110 is disposed in a plane to engage the edge of a pusher link 112 that is rotatable about one end on a shaft 114 and which carries a tension spring 116 at the opposite end to bias the pusher link 112 against the bushing 110. Generally midway of the pusher link 112 is a shaft 118 which extends vertically upward and carries a rigid cylindrical roller 119 aligned with the edge of the cartridge 10. Through the pusher link biasing spring 116, the roller 119 in the operative position illustrated in FIG. 2 provides a resilient force on the edge of the cartridge. This force is transferred through the cartridge to the pressure roller 18 to provide resilient pressure between the pressure roller 18 and the capstan 52 to provide uniform movement of the magnetic tape 39.

In use, the cartridge 10 is placed in the machine by aligning its complementary cartridge mating aperture 16 with the cartridge mating and support shaft 54 and its body between the cartridge locating shafts 68 and 69 and then dropping the cartridge downward. Since the support shaft 54 and the cartridge mating aperture 16 are complementary, when the cartridge 10 is placed in the machine the shaft 54 and the aperture are coaxial and define a pivot axis for the cartridge. The axis of the pressure roller 18 and the axis of the capstan 52 are both parallel to this pivot axis and therefore they are parallel to each other as desired for proper driving of the tape 39.

The machine is then placed into operation by pushing a button (not shown) which actuates the solenoid 107 to rotate the solenoid link 102 counterclockwise as viewed in FIG. 2. The solenoid link 102 strikes the lobe of the lower knuckle 85, thereby breaking the lower knuckle 85 and engaging the pin 98 extending from the upper knuckle 86 to make the upper knuckle 86. As the knuckles 85 and 86 exchange positions the eccentric gear support link 78 is permitted to rotate clockwise about the cartridge mating and support shaft 54 and is urged to do so by its associated tension spring 83. As the support link 78 rotates, the bushing 110 at its end removed from the knuckles 85 and 86 also moves. This permits the cartridge pusher link 112 to rotate clockwise about its support shaft 114 under the influence of its spring 116 so that the roller 119 presses against the edge of the cartridge 10. At the same time, the cartridge locating link 64 rotates clockwise to carry the edge of the cartridge 10 under the resilient wheel 75 of the cartridge holddown 71 and to move the cartridge into operative relationship with the magnetic head 56 and the capstan 52. The resilient force of the roller 119 against the cartridge 10 forces the pressure roller 18 against the capstan 52 sufficiently to drive the tape between them. As eccentric gear support link 78 makes its rotation the long side of the eccentric gear 81 engages the capstan gear 80 to provide a smooth engagement of the roller 119 against the cartridge 10 rather than a snap action under the influence of the snapping of the knuckles 85 and 86. At this stage, the apparatus is in a position as shown in FIG. 2 with the tape pressed between the pressure roller 18 and the capstan 52 and drawn past the magnetic head 56 for recording or reproduction.

When it is desired to discontinue recording or reproduction, a switch (not shown) is again pushed to actuate the solenoid 107 to rotate the solenoid link 102 in a clockwise direction. Such rotation of solenoid link 102 disengages it from the upper knuckle pin 98 and permits the spring 87 to break the upper knuckle 86. Breaking the upper knuckle 86 permits the eccentric gear support link 78 to rotate slightly clockwise to engage the eccentric gear 81 with the capstan gear 80. Such engagement drives eccentric gear 81 along its short edge providing counterclockwise rotation of the support link 78 about the cartridge mating and support shaft 54 moving its bushing 110 against the cartridge pusher link 112 and disengaging the roller 119 from the cartridge 10. At the same time, the cartridge locating link 64 is rotated counterclockwise about support shaft 54 and the locating shafts 68 and 69 rotate the cartridge 10 to disengage the pressure roller 18 from the capstan 52 and to disengage the tape from the magnetic head 56. As the eccentric gear 81 makes its furthest excursion, the spring 100 straightens the lower knuckle 85 and as the eccentric gear 100 continues to rotate it separates from the capstan gear 80.

Having thus described the present invention,

What is claimed is:

1. In combination with a tape recording and/or reproducing machine having a rotatably driven capstan and a cartridge formed of shell means defining a boxlike enclosure having an opening for access to the interior thereof by said capstan, the improvement comprising:
   - complementary mating means in said cartridge and said machine defining a pivot axis for said cartridge on said machine parallel to and spaced from the axis of said capstan,
   - a pressure roller supported by the said shell means adjacent said access opening for rotation about an axis parallel to and spaced from said pivot axis,
   - means defining a tape guide path within said enclosure extending between said pressure roller and said capstan in said access opening,
   - a length of magnetic tape extending along said tape guide path, and
   - means for rotating said cartridge about said pivot axis to press said magnetic tape between said capstan and said pressure roller to drive the same along said tape guide path.

2. The combination of claim 1, wherein said shell means has a cutaway portion along one edge of said container exposing said magnetic tape in said tape guide path for engagement by a transducer positioned adjacent said capstan and including a tape tensioning means within said shell means along said tape guide path for applying a braking force to said magnetic tape in advance of said cutaway portion and said pressure roller.

3. The combination of claim 2, wherein said length of magnetic tape forms an endless loop within said container.

4. The combination of claim 1 wherein said shell means includes parallel sidewall defined by a pair of substantially similar metal plates in parallel spaced relation perpendicular to the axis of and rotatably supporting said pressure roller and wherein said complementary mating means include a cartridge support and mating shaft in said machine with its axis parallel to the axis of said capstan and an aperture formed through said cartridge complementary to said mating shaft with its axis parallel to the axis of said pressure roller, said aperture being defined by precisely aligned similar apertures formed in said metal plates.

5. The combination of claim 4, wherein said means for rotating said cartridge about said pivot axis includes movable means spaced from said cartridge mating shaft for engaging the exterior of said shell means to rotate said cartridge about said mating shaft to engage said pressure roller with and disengage it from said capstan.

* * * * *